FIG. 2a
FIG. 2b
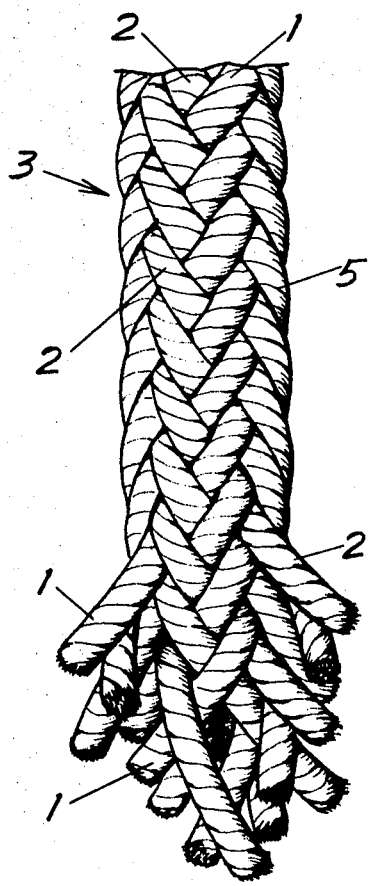
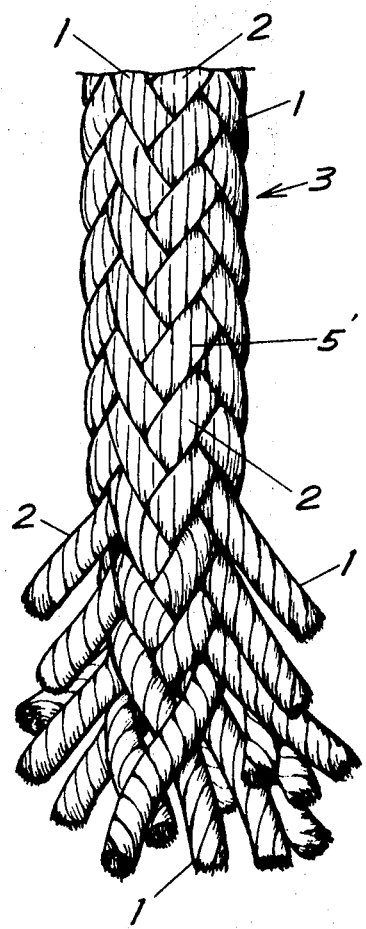

United States Patent Office 3,606,815
Patented Sept. 21, 1971

3,606,815
BRAIDED CORD NET
Shigeru Yamashita and Satoshi Kawafuchi, Wakegun,
Japan, assignors to Morishita Fishing Net Manufacturing Co. Ltd., Wakegun, Okayama, Japan
Filed May 23, 1969, Ser. No. 827,225
Claims priority, application Japan, May 25, 1968,
43/43,195
Int. Cl. A01k 73/00; D04c 1/06
U.S. Cl. 87—12                                        3 Claims

ABSTRACT OF THE DISCLOSURE

A fish net made of braided cord with the meshes connected by knots. The cord is braided from a group of strands twisted in one direction, and another group of strands twisted in the other direction, and alternating with the strands of the first group. The lay of the cords may be in the same direction of the twist or, in another modification, the lay may be in a direction opposite to the twist.

---

The present invention relates to a cord net and, particularly, to a braided cord net for fishing in waters or rescuing in emergencies on land.

Heretofore, the conventional nets of such kind were commonly made of twisted strands, knotted in suitable spaces. Often, some of their knots loosened by themselves with the result that their meshes or loops slipped down, producing larger and smaller meshes and permitting the escape of larger things captured.

Moreover, the conventional braided cord net for fishing sustained a tremendous amount of damage in trawl fishing by wear due to frictional contact with rocks, sand and mud on the seabeds, or with hull edges of trawl ships. Thus it was necessary to provide means to increase the resistance to such frictional abrasion, when braided cords of the nets were made of strands twisted in only one direction, either rightward or leftward.

When the cords are braided with all the strands only of the leftward twist, and those strands are wound into cords in a leftward direction, the result is known as a Lang's lay. On the other hand, when such left twisted strands are wound rightward, the result is known as an ordinary lay. Now, if cords of one twist (either right or left) are alternately wound to right and to left, crossing over one another, a complex stripe pattern of twist ply will result caused by the longitudinal and transverse appearance of the ply lines of the strands. In other words, the leftward twisted strands wound in the leftward direction will show transverse ply lines; and same left-twisted strands wound in rightward direction will show longitudinal ply lines; and, furthermore, wavy bulgings will be caused. When the cords are placed on the netting machine under such condition, the knots are not able to be tightened securely during the netting machine operation and also during subsequent heat treatment; and re-tightening is difficult to execute properly due to big frictional resistance of wavy bulgings. This is a considerable disadvantage for producing fishing nets of good quality. As described above, if the resisting feature of the cord for surface friction is made larger, it becomes difficult to tighten knot joints of nets in that manner.

The object of the present invention is to provide an improvement which will overcome such disadvantages.

The present invention provides a braided cord net of natural fibers or artificial resin fibers knotted in specific sequence, said cords being braided with two kinds of twisted strands, the one being twisted in rightward direction and the other in leftward direction, said strands being positioned one after another in a circle, with the right-twisted strands being wound (or laid) leftward and the left-twisted strands being wound rightward around the cord axis alternately to intercross each other. Under such conditions, when the numbers of twists are decreased in processing (twisting direction of the strand and laying direction of the strand are reversed, as the so-called ordinary lay), the laying direction of the ply on the outer surface of the strand in the cord appears longitudinal to the cord axis. Quite contrary to this, in another case, when the numbers of twists are increased (twisting direction of the strands and the laying directions are the same) as in the so-called Lang's lay, the laying direction of the ply on the outer surface of the strand in the cord becomes transverse to its axis. The surface density in each case is less wavy than those of the prior art, and resisting features for surface abrasion may be increased. The braided cord net is made by means of knotted joints or other joints with these cords, after which the net may be processed in heat treatment and/or resin process.

A preferred embodiment of the invention will now be described with reference to the accompanying drawing wherein:

FIGS. 2a and 2b are enlarged front views of two kinds of the braided cord for the net, the former having plies transverse to the center axis of the cord and the latter having plies longitudinal to the center axis;

Figure 3:
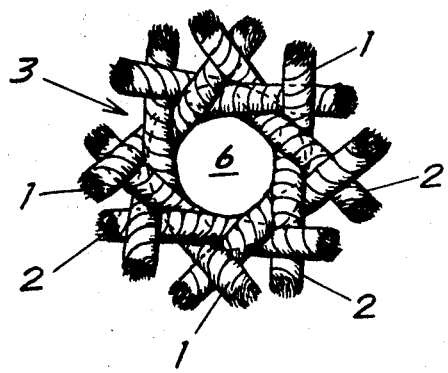
FIG. 3 is an end view of one of the braided cords in FIGS. 2a and 2b.

As shown in FIGS. 2a and 3, two kinds of strands are prepared, both in a large number, as leftward twisted strands 1 and rightward twisted strands 2 made of polyamide polyvinyl, polyester, polyvinylidine, polyolefin, etc. The requisite equal number of both strands are positioned in a suitable braiding machine, and the braiding operation is carried out for inter-crossing them alternately in a suitable manner by the braiding machine. As shown in FIG. 2a, the left-twisted strands 1 are laid to the leftward direction and the right-twisted strands 2 to the rightward direction to form the cord, i.e., the braiding is performed as Lang's lay (the strands are in the direction to increase twist) and the laying direction of the ply on the outer surface of the strand in the cord becomes transverse to the axis, whereby the surface of the cord is less wavy and resisting features for its surface friction are increased. The braided cord net is made by means of knotted joints with the braided cord as in FIG. 1, after which the net may be processed with heat treatments and/or resin process.

In another way, in FIG. 2b, the leftward twisted strands 1 are laid to the rightward direction and the rightward twisted strands 2 to the leftward direction, i.e., the braiding is performed in ordinary lay to get a braided cord 3' wherein the strands are laid in the direction to decrease twist, and the laying direction of the ply on the outer surface of strands in the cord becomes almost longitudinal to the axis of the cord. The result is that the surface density of the cord is less wavy than in the prior art and resisting features of its surface abrasion are improved. The braided cord net is made with the cord 3' in the same manner as explained heretofore.

Now, with the twisted ply which is at right angles to the axis of braiding, it is hard to make knot joints tight; but, on the other hand, in case the knots are once tightened by strong pull, it is hard to loosen them. In contrast, with the twisted ply running parallel with the cord axis, it is possible to make and constrict the knot joints of the braided cord more easily and more firmly and they are less liable to loosen up.

Figure 1:
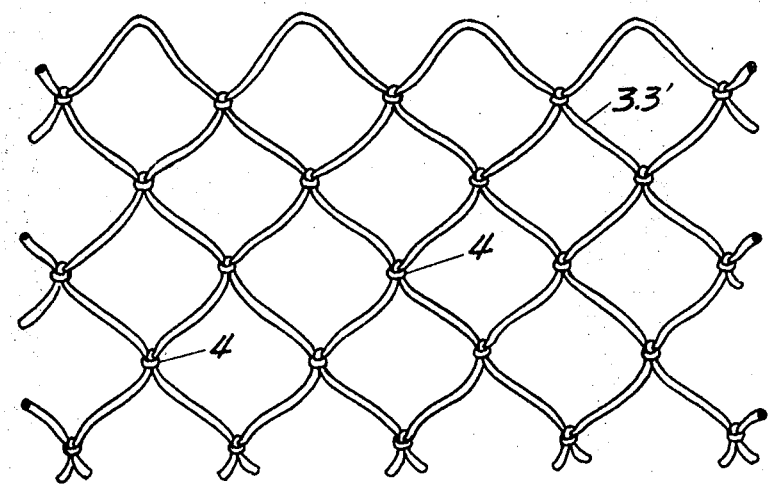
FIG. 1 is a partial front view of a net of the braided cord according to the present invention.
Figure 4:
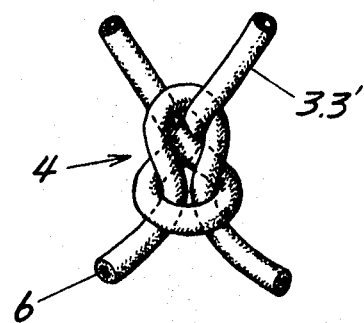
FIG. 4 is an enlarged front view of one of the knotted joints shown in FIG. 1 with the knot loosened.

With these braided cords, a net having tight knot joints similar to bowline shown in FIG. 4 is made up as shown in FIG. 1.

The fishing net in accordance with the present invention comprised of braided cord of twisted strands of various synthetic fibers as mentioned above, has strong resisting features during its use in fishing operations against abrasions by obstacles such as rocks, sand and mud on the seabed, or on ships' sides; and nets made of such braided cords possess a stronger resistance against surface friction as the result of increasing twist or number of composing strands and they are more durable. Also, when the strand is braided into cord, it is possible to provide a smooth cord surface, either by adding or reducing twists in right- or leftward twist so as to make it easy to make knot joints of the cord tight in the net by utilizing the ply of the strand and depression of the cord in the knots.

Although the invention has been described with a certain degree of particularity; it is understood that the present disclosure has been made only by way of examples and numerous changes in details of construction and combination of parts may be made without departing from the spirit and scope of the invention as hereafter claimed.

What we claim is:

1. A braided cord net formed of interengaging cords, in which the interengagements of the cords are connected by knots, said cords being braided and comprised of a group of strands in which the fibers are twisted leftward and a group of an equal number of strands in which the fibers are twisted rightward, one group being laid in a leftward direction and the other group being laid in a rightward direction, said cords intercrossing each other alternately.

2. A braided cord net as claimed in claim 1 wherein the left-twisted strands are laid in a leftward direction and wherein the right-twisted strands are laid in a rightward direction.

3. A braided cord net as claimed in claim 1 wherein the left-twisted strands are laid in a rightward direction and wherein the right-twisted strands are laid in a leftward direction.

References Cited
UNITED STATES PATENTS

| | | | |
|---|---|---|---|
| 2,162,115 | 6/1939 | Pauls | 87—12 |
| 2,823,575 | 2/1958 | Needham et al. | 87—12X |
| 3,329,061 | 7/1967 | Momoi | 87—12 |

JOHN PETRAKES, Primary Examiner

U.S. Cl. X.R.

43—7; 57—139